June 3, 1952        J. L. DRAKE        2,598,894
APPARATUS FOR PRODUCING GLASS SHEETS
Filed Sept. 14, 1945
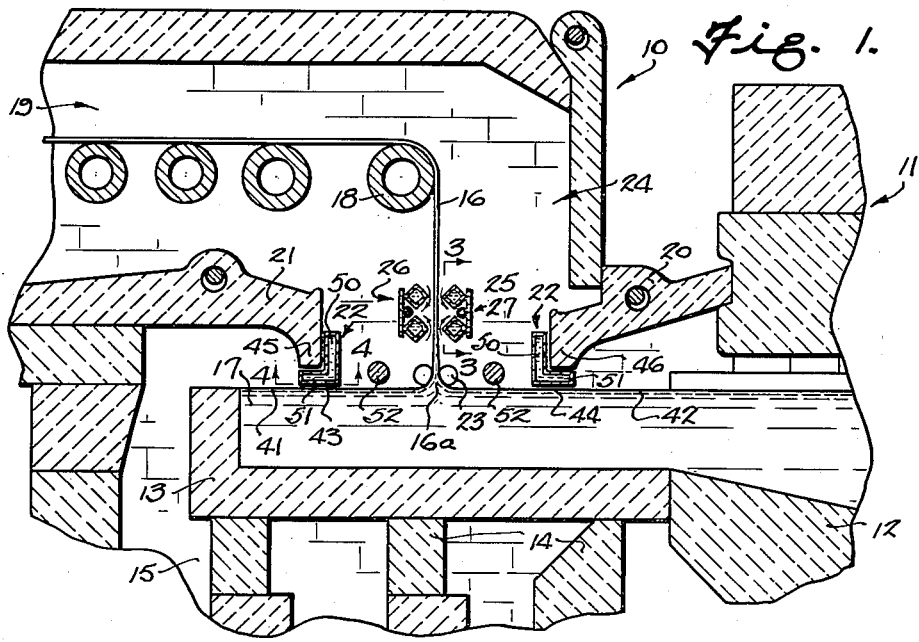
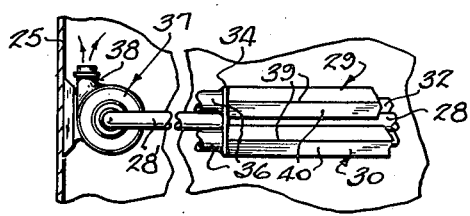
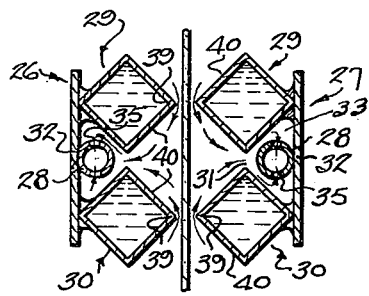
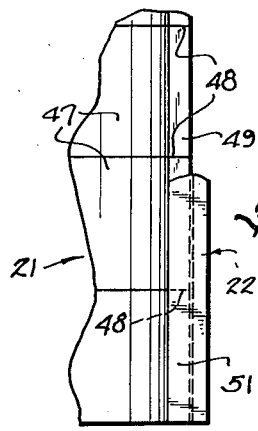
Inventor
JOHN L. DRAKE
By Frank Fraser
Attorney Patented June 3, 1952

2,598,894

UNITED STATES PATENT OFFICE 2,598,894

APPARATUS FOR PRODUCING GLASS SHEETS

John L. Drake, Toledo, Ohio, assignor to Libbey-Owens-Ford Glass Company, Toledo, Ohio, a corporation of Ohio Application September 14, 1945, Serial No. 616,295

3 Claims. (Cl. 49—17)

The present invention relates to the manufacture of flat glass, and more particularly to the production of so-called "sheet" or "window" glass wherein a ribbon or sheet is continuously drawn from a bath of molten glass contained in a working receptacle.

There are a number of different types of commercially successful machines on which perfectly transparent glass sheets having a good fire polished surface finish can be made in this manner; that is, by literally pulling a continuous ribbon of glass bodily from the surface of a molten mass. And such sheets are commercially acceptable for a great many purposes, including most ordinary window glazing.

However, they have heretofore been considered definitely inferior to ground and polished plate glass because they were considerably less uniform in thickness, and exhibited characteristic defects known as streaks, waves and distortion that are quite apparent to the trained observer.

The thickness of a ribbon or sheet being drawn from a bath of molten glass is dependent primarily on the viscosity of the glass and on the speed at hich it is drawn, and the glass viscosity is, of course, determined by its temperature. Consequently, it is pretty generally accepted that the defects mentioned above are chiefly due to alternate hot and cold streaks, lines, spots or similar areas in the glass, resulting from a lack of temperature uniformity that is more or less inherent in the well known types of drawing machines.

Many attempts have been made to reduce, correct or overcome the unsatisfactory temperature conditions in these machines, and particularly in the drawing chambers thereof, with varying degrees of success. For example, it is believed that most of the uneven temperature effect results from uncontrolled air currents and movements that are naturally set up around the rising sheet in the drawing chamber, and it has become quite customary to enclose this chamber as completely as possible from the outside air.

This has proved to be good practice, especially in cutting down the stack effect in the machines which carries hot air upwardly along the center line of the glass sheet being formed and pulls relatively cold air inwardly from beyond its edges. However, it is definitely a reducing action rather than a completely corrective one, because there is always some infiltration of cool outside air through these enclosures.

In my earlier filed applications Serial No. 611,505, filed August 20, 1945; Serial No. 611,506, filed August 20, 1945; Serial No. 611,507, filed August 20, 1945, now abandoned; and Serial No. 611,508, filed August 20, 1945; I have outlined ways and means for more completely overcoming the effects of objectionable air movements within the drawing chambers of conventional drawing machines, by a positive cooling action exerted across a critical area transversely of the sheet being drawn, and by the use of counter-currents of conditioned air to counteract the stack effect, convection currents and other uncontrolled air movements that are naturally present around the sheet.

The methods and apparatus disclosed in these applications, particularly in combination with standard machine enclosures, are considered to represent an important step forward in the art of drawing sheet glass. Nevertheless, it is an aim of the present invention to carry the improvement still further and to draw sheet glass of even higher quality, and more uniform thickness, at a still higher rate of speed.

Briefly stated, the invention is based on the discovery that, in addition to the irregularly heated areas that are set up in the newly formed sheet by the atmospheric conditions surrounding it, there are also hot and cold streaks that are transmitted into the sheet as a result of similar conditions in the molten bath.

And on the further discovery that these streaks, which are of longer standing than the others in the sheet and so may be expected to be very difficult to level off or equalize, can be neutralized by subjecting the surface of the molten glass, as well as the sheet being drawn, to a special conditioning treatment.

The principal object of this invention is the provision of a novel apparatus for conditioning the glass, both in the bath and in the sheet, for this purpose; and which conditioning involves the alternate heating and cooling of the moving glass surfaces transversely thereof, in a controlled manner and through a time and space cycle of considerable extent.

Still another object is the provision of special types of heat exchangers for the above purpose, including one that is particularly adapted to cool the surface of the molten glass across a definite predetermined transverse area, and to simultaneously protect the bath from the temperature disturbing effects of contiguous surfaces.

Other objects and advantages of the invention will become more apparent during the course of the following description, when taken in connection with the accompanying drawings.

In the drawings, wherein like numerals are employed to designate like parts throughout the same:

Fig. 1 is a longitudinal, vertical section through a sheet glass drawing machine of the Colburn type, showing the apparatus of my invention being used in conjunction therewith;

Fig. 2 is an enlarged view of the sheet cooling device shown in Fig. 1;

Fig. 3 is a section taken substantially on the line 3—3 of Fig. 1; and

Fig. 4 is a fragmentary, bottom view of the forward end of one of the lip-tiles of Fig. 1, with the special bath protecting cooler associated therewith, looking in the direction of the arrows on the line 4—4 in Fig. 1.

As indicated above, the invention can be adapted to any of the sheet glass drawing machines in commercial use today. For the purpose of illustration it has been shown, and will be described herein, in connection with a drawing machine of the Colburn type, which is believed to be representative and to exhibit the characteristic problems encountered.

Thus the machine designated in its entirety by the numeral 10 in Fig. 1, is associated with the working end of a continuous tank furnace 11. Properly conditioned molten glass is fed through the cooling chamber 12 of the furnace into a working receptacle or draw pot 13, mounted on stools 14, in a pot chamber 15, which is heated by suitable gas burners (not shown).

A sheet of glass 16 is drawn continuously upward from the molten bath 17 in the receptacle 13, moving first in the vertical plane and then being bent into the horizontal over a bending roll 18, after which it passes through a flattening chamber 19 and an annealing leer (not shown) before being cut up into individual sheets or plates. The rising sheet 16 is held to width by the action of knurled rollers 23, rotating in the edge portions of the meniscus or enlarged base portion 24 at a speed slightly slower than the speed of travel of the sheet.

In order to shield the sheet 16 from blasts of hot air or products of combustion from the furnace or from the pot chamber 15, lip-tiles 20 and 21 and lip-tile coolers 22 are arranged thereabove as shown in Fig. 1. The coolers shown here are of a special type and differently shaped from the ones generally used, the latter being ordinarily of a simple rectangular outline in cross section.

Thus far, then, with the exception of the particular shape of the coolers 22, the apparatus described has been that of the usual Colburn machine and associated parts. As pointed out above it is also quite customary to close the ends of the drawing chamber 24 to the outside atmosphere by means of suitable closure means indicated at 25, but in such a machine there will still be a certain amount of stack effect which will draw cold air in from the sheet edges and carry hot air upwardly along the path of travel of the sheet.

As the sheet being formed moves upwardly, the meniscus or base portion 16a is pulled progressively thinner and thinner until the sheet is substantially set, by which time the final desired thickness has been attained. This all occurs in the area above the molten bath 17 and which is bounded by the lip-tiles 20 and 21, and coolers 22, and which is considered to be the sheet forming zone. Within this area or zone the thinning sheet is particularly susceptible to temperature conditions, and yet the natural conditions within the machine are such that the continuous movement of air of varying degrees of temperature over the newly forming sheet, in the manner described above, combines with the convection currents that are always set up along a heated surface to create and perpetuate an uncontrolled atmospheric turbulence at this most critical point in the formation.

However, the effect on the sheet of these particular conditions can be overcome in the manner described in my copending applications referred to above. That is, by interrupting the flow of the natural convection currents along the rising sheet, and by susbtituting a positive cooling action and/or a controlled air movement for the natural, uncontrolled atmospheric and temperature conditions in the area.

Here, I prefer to use for this purpose a pair of special heat exchangers 26 and 27 arranged one on either side of the sheet and closely adjacent thereto as best shown in Figs. 1 and 2. In order to accommodate this control apparatus to various conditions it is desirable to mount the heat exchangers 26 and 27 for at least some degree of universal movement so that the position of either one or both of them may be shifted slightly in one direction or another, depending on the temperatures used, the thickness of sheet to be drawn, or other specific conditions that may be encountered.

Each of the heat exchangers 26 and 27 comprises a vertical supporting plate 32 extending from side to side of the machine, and welded or otherwise secured to this plate are a pair of sheet metal casings 29 and 30, diamond shaped in cross section. By the term diamond shaped I intend also to include casings that are actually square in cross section but that are so arranged as to appear diamond shaped because two of their opposite corners are in vertical and two in horizontal alignment. In fact, I have found that, in actual practice, ordinary square tubing which is readily available commercially is well suited for this purpose.

The two diamond shaped casings are secured to the plate 32 adjacent its top and bottom so that they are in vertical alignment with and slightly spaced from one another to form a slot 31 therebetween. A cylindrical pipe 28 is also welded to the face of the plate 32 on the same side as and midway between the casings 29 and 30. The ends of the casings themselves and of the passageway 33, bounded by the casings and the plate 32, are closed by a suitable sheet of metal or the like 34; and the pipe 28 is placed in communication with both the passageway 33 and the slot 31 between the casings by means of openings 35 spaced at intervals along its length.

A cooling medium such as water is circulated through the casings 29 and 30 by means of the pipes 36, and the perforated pipe 28 is connected to the intake side of a blower 37 to set up a controlled flow of air over the glass sheet 16 along the paths indicated by the arrows in Fig. 2. The openings 35 may be of uniform size and uniformly spaced throughout the length of the pipe 28. Or, they may be graduated in either size or spacing to provide a controlled flow of air that is proportionate to the amount of cooling desired at any given point across the width of the glass sheet. The blower 37 may be exhausted to the outside, but it is preferred that the outlet pipe 38 be inside the machine enclosure 25 as shown.

With the arrangement just described, no outside air is used in setting up the controlled air flow. Instead, a continuous circulation of the air already in the zone of sheet formation is effected. This has the advantage that a more uniform temperature across the sheet will result, with little or no preconditioning of the circulated air being necessary. Moreover, the use of the air already within the chamber avoids the introduction of dirt and other foreign matter from outside. If desired, heat exchangers or other air conditioning means can be interposed in the pipe 28' leading to the blower 37.

The casings 29 and 30 really serve a twofold purpose. In the first place they exert a positive and accelerated line cooling action on the glass sheet opposite the corners 39, combined with a lesser cooling action between these lines. This produces a more uniform cooling action across the sheet than is obtained with any kind of flat cooler. The reason for this lies in the fact that sheet metal of sufficient thinness to make satisfactory coolers is usually wavy and of not particularly uniform thickness. Consequently, when a fairly wide surface is presented directly to the sheet to be cooled the cooling action will vary in accordance with the unevenness and lack of uniformity of the sheet metal surface of the cooler.

This is not true of the line cooling here, because the corners 39 of the coolers can be readily made equidistant from the sheet and substantially equal in their cooling action throughout their length. Moreover, the cooling action exerted by the flat portions 40 of the casings, and which for the reasons given above is less uniform, is also of less intensity because these flat portions slant sharply away from the sheet. For the same reason their cooling action will be indirect and will tend to equalize before it is felt on the sheet.

The second function of the casings 29 and 30 is to condition the air being drawn between them and the glass sheet, as to temperature. This tempered or conditioned air, moving from the forming zone through the cooler structure and into the pipe 28, acts to further accelerate and to distribute the effect of the line cooling on the sheet, and at the same time to further equalize the cooling action between and to either side of the sharp cooling lines. This accelerating and equalizing action is further assisted by the fact that the flow of the tempered air is relatively slow in the spaces between the glass and the angled sides 40 of the casings, but increases sharply in velocity when it is flowing through the narrow spaces between the glass sheet and the corners 39.

It will also be noted that the cooling action exerted by the heat exchangers 26 and 27 is really of two distinctly different types. In other words one phase of the cooling is accomplished by the absorption of radiant heat by the casings 29 and 30, and this is combined with the controlled convection cooling resulting from the flow of air over the glass sheet and toward the pipe 28.

Now this arrangement will counteract the effects of the non-uniform temperature and atmospheric conditions that are naturally present in the zone of sheet formation, and by its uniform and positive cooling action will also tend to equalize and level off any hot and cold streaks that may be drawn into the sheet from the bath itself. However, this latter may be difficult to do, particularly in extreme cases, within the comparatively short time that the sheet is in the forming zone.

Accordingly, in the present invention, the conditioning of the newly forming sheet itself is merely one step in a more complete glass conditioning treatment that begins with the flow of glass toward the rising sheet from the ends of the working receptacle, and continues until the sheet has become substantially set in its final form.

The particular conditioning treatment employed consists in subjecting the surface of the glass to a succession of alternate heating and cooling treatments that are exerted transversely thereof and are both pre- and postnatal, so that they extend over the entire time during which such treatment can affect the final quality or contour of the finished sheet.

The theory behind this particular type of treatment is that when the surface of a body of glass in molten or plastic condition is heated uniformly throughout its width the colder areas of this surface will absorb more heat than will the hotter areas. Conversely, when such a surface is cooled, more heat will be absorbed from the hotter areas than from the cooler ones. Consequently, a succession of such heating and cooling treatments will ultimately neutralize non-uniform temperature conditions in the glass body by continuously heating the cold portions faster than the hot ones, while at the same time cooling the hot portions faster than the cold ones.

A simple but effective embodiment of the invention is illustrated in the drawings, and this set-up is readily adaptable to existing machines because it requires a very minimum of departure from standard construction and regular equipment.

As can be seen, in these Colburn type machines, the glass in the molten bath moves into the sheet being formed from both ends of the working receptacle or draw pot. The distance to the sheet in each case is about the same and this facilitates uniform treatment from both sides. Thus, the surface of the glass at the left hand or closed end of the draw pot 13 will be heated over a definite predetermined area 41 transversely thereof by hot air from the pot chamber directed onto the bath 17 by the curving underside of the lip-tile 21. Similarly, the glass surface 42 at the right hand or open end of the pot is heated by hot air from the furnace directed thereon by the underside of the lip-tile 20.

A reasonably uniform heating from side to side of the molten glass over these areas in the pot is obtained in this way and, because of the distance from the sheet, this type of heating will usually be satisfactory here. However, for more exact control other kinds of heating can be used. For example, the heated air from the pot chamber and surface may be sealed off from the surface of the molten bath, and electrical heating elements may be substituted for the air as the heating means.

Immediately in advance of the transverse areas 41 and 42 are lip-tile coolers 22 which act to uniformly cool transverse areas 43 and 44 across the molten bath. In the usual Colburn machine the front wall 46 of the lip-tile 20 and the front wall 45 of the lip-tile 21 approach very closely to the surface of the molten bath, while the coolers 22 are arranged in front of the lip-tiles only. I have determined that this condition, in itself, is one cause of the hot and cold streaks in the surface of the molten bath entering the sheet.

To explain, the width of the present day draw pot makes it impractical to use a one-piece lip-tile extending entirely across. It is therefore necessary to use lip-tiles that are made up of a plurality of sections 47, as shown in Fig. 4, and the lines 48 between these sections on the bottom surface 49 of the front wall of the tile is a constant source of lines or streaks that differ in temperature from the glass at either side.

The coolers 22 have the double purpose of acting to equalize any hot and cold streaks that may be in the glass when it reaches this point, and also of preventing the lip-tile lines 48 from setting up additional hot and cold areas in the glass as it passes therebeneath.

To accomplish these functions the coolers 22 are L-shaped in cross section, with the vertical leg 50 of the L being just in front of the lip-tile in the usual manner, and with the foot 51 of the L extending between the bottom of the front wall of the lip-tile and the surface of the molten glass to effectively protect the latter from the former. The presence of the foot 51 on the coolers 22 also greatly increases their cooling capacity and the effect that they exert on the glass surface.

The next step in the process is to again uniformly heat the surface of the molten bath across a definite predetermined area, and I prefer to accomplish this by means of glow bars 52 or similar electric resistance elements positioned just above the molten bath between the coolers 22 and the sheet 16. The cylindrical type glow-bar shown is particularly satisfactory because it exerts an accelerated heating action on the glass along a line opposite the center line of the heating bar, and a progressively lessening heating action at either side of this line as the round bottom surface of the bar curves farther and farther away from the molten bath.

Under the influence of the alternate heating and cooling just described, by the time the glass in the molten bath reaches and moves into the sheet 16 it will have a substantially uniform surface temperature over its entire area. Nevertheless, a further corrective cooling action in the alternate heating and cooling cycle is exerted by the heat exchangers 26 and 27 on the surface of the sheet during the time that it is in the forming zone.

This action, as well as the manner in which this sheet cooling device overcomes the adverse conditions peculiar to this area of the machine, have been described in detail above.

By the use of my invention, with proper control of the air and water temperatures and pressures, the glass going into the sheet being formed will be cooled and conditioned much more uniformly than has heretofore been considered possible. It can also be cooled faster and with no injurious effects. Consequently, sheets of better quality can be drawn from the molten bath, and at a higher rate of speed. This last permits considerably greater production from existing machines, and a further increase can be effected by the use of wider machines made possible by this remarkably uniform conditioning of the sheet.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

I claim:

1. In apparatus for producing flat glass, a working receptacle containing a bath of molten glass, means defining a zone of sheet formation, means for drawing a ribbon or sheet from said bath through said zone, radiant heaters spaced from either side of the base of said sheet and remote therefrom directly above the surface of the molten bath and extending thereacross, and heat exchangers arranged closely adjacent either side of the glass sheet and including heat absorbing surfaces in close proximity to said sheet and means disposed between said absorbing surfaces for creating a flow of conditioned air in contact therewith.

2. In apparatus for producing flat glass, a working receptacle containing a bath of molten glass, means defining a zone of sheet formation, means for drawing a ribbon or sheet from said bath through said zone, a pair of lip-tiles at opposite sides of the zone of sheet formation positioned above the molten bath and provided with downwardly projecting portions having bottom faces approaching the surface of said bath, a pair of coolers L shaped in cross section, each arranged with the foot of the L between the bottom face of the downwardly projecting portion of one of the lip-tiles and the surface of the molten bath, means for heating the sheet across a transverse area between said coolers and the sheet being drawn, and heat exchangers arranged at either side of the glass sheet and including heat absorbing surfaces in close proximity to said sheet and means for creating a flow of conditioned air in contact therewith.

3. In apparatus for producing flat glass, a working receptacle containing a bath of molten glass, means defining a zone of sheet formation, means for drawing a continuous sheet from said bath through said zone, heat exchangers arranged at opposite sides of the glass sheet within said zone, each of said heat exchangers comprising a vertical supporting plate, a plurality of substantially rectangular casings carried by said plate and facing said sheet and arranged one above the other, said casings being disposed on edge so that they are arranged corner to corner in a single vertical plane to effect an accelerated cooling action along spaced transverse lines and a lesser cooling action therebetween, and a cylindrical perforated tube also carried by said plate and disposed between said casings to create a continuous and controlled flow of conditioned air over the surface of the sheet across said transverse lines of cooling, means for circulating a cooling medium through said casings, and means for effecting a continuous removal of air from said tubes.

JOHN L. DRAKE.

REFERENCES CITED

The following references are of record in the file of this patent:

UNITED STATES PATENTS

| Number | Name | Date |
|---|---|---|
| 1,015,404 | Schewczik | Jan. 23, 1912 |
| 1,248,809 | Colburn | Dec. 4, 1917 |
| 1,489,876 | Whittemore | Apr. 8, 1924 |
| 1,554,269 | Ferngren | Sept. 22, 1925 |
| 1,761,195 | Drake | June 3, 1930 |
| 1,795,943 | French | Mar. 10, 1931 |
| 1,841,548 | Nobbe | Jan. 19, 1932 |
| 2,125,914 | Haight | Aug. 9, 1938 |
| 2,201,286 | Bundy | May 21, 1940 |
| 2,246,053 | Magrini | June 17, 1941 |
| 2,278,328 | Magrini | Mar. 31, 1942 |
| 2,352,539 | Halbach et al. | June 27, 1944 |
| 2,417,094 | Spinasse | Mar. 11, 1947 |